United States Patent
Bedard et al.

(10) Patent No.: US 10,401,563 B2
(45) Date of Patent: Sep. 3, 2019

(54) OPTICAL FIBERS FOR SIMULTANEOUS MEASUREMENT OF TEMPERATURE AND STRAIN

(71) Applicant: OFS Fitel, LLC, Norcross, GA (US)

(72) Inventors: Kyle Bedard, Sturbridge, MA (US); Robert S Dyer, East Granby, CT (US); Jie Li, Unionville, CT (US); Xiaoguang Sun, West Hartford, CT (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 16/129,159

(22) Filed: Sep. 12, 2018

(65) Prior Publication Data

US 2019/0187367 A1 Jun. 20, 2019

Related U.S. Application Data

(60) Provisional application No. 62/598,515, filed on Dec. 14, 2017.

(51) Int. Cl.
| | |
|---|---|
| *G02B 6/036* | (2006.01) |
| *G01K 11/32* | (2006.01) |
| *G01B 11/16* | (2006.01) |
| *C03B 37/012* | (2006.01) |
| *C03B 37/025* | (2006.01) |
| *C03C 13/04* | (2006.01) |

(52) U.S. Cl.
CPC ........ *G02B 6/036* (2013.01); *C03B 37/01262* (2013.01); *C03B 37/025* (2013.01); *C03C 13/045* (2013.01); *G01B 11/16* (2013.01); *G01K 11/32* (2013.01); *C03C 2213/00* (2013.01); *G01K 2011/322* (2013.01)

(58) Field of Classification Search
CPC ... G02B 6/036; C03C 13/045; C03C 2213/00; G01B 11/16; G01B 11/32; G01K 2011/322; C03B 37/01262; C03B 37/025
USPC .......................................................... 385/12
See application file for complete search history.

(56) References Cited

U.S. PATENT DOCUMENTS

| | | | |
|---|---|---|---|
| 2006/0185397 A1* | 8/2006 | Baumgart | C03B 37/01807 65/377 |
| 2012/0123702 A1* | 5/2012 | Chen | G01K 11/32 702/42 |

OTHER PUBLICATIONS

Lee et al.; "Utilization of a Dispersion-Shifted Fiber for Simultaneous Measurement of Distributed Strain and Temperature Through Brillouin Frequency Shift"; IEEE Photonics Technology Letters; vol. 13, No. 10; Oct. 2001, pp. 1094-1096.

(Continued)

*Primary Examiner* — Jerry M Blevins
(74) *Attorney, Agent, or Firm* — David Rodrigues; Cantor Colburn LLP (57) ABSTRACT

Disclosed herein is an optical fiber comprising a plurality of dopant concentration profiles in a core of the optical fiber; where the first dopant concentration and the second dopant concentration are each varied in a stepwise manner and wherein a ratio of the first dopant concentration to the second dopant concentration is operative to result in an interaction of a fundamental optical mode at a given wavelength with a plurality of acoustic modes thereby increasing a ratio of Brillouin Scattering intensity ratio of secondary, tertiary or quarternary peak relative to a Brillouin Scattering intensity of a primary peak to be greater than 0.4 in a Brillouin Scattering spectrum.

12 Claims, 5 Drawing Sheets

(56) References Cited

OTHER PUBLICATIONS

Liu et al.; "Brillouin Spectrum in LEAF and Simultaneous Temperature and Strain Measurement"; Journal of Lightwave Technology; vol. 30, No. 8; Apr. 15, 2012, pp. 1053-1059.
Weng et al.; "Single-end simultaneous temperature and strain sensing techniques based on Brillouin optical time domain reflectometry in few-mode fibers"; Optics Express; vol. 23, No. 7; Apr. 6, 2015, 16 pages.

* cited by examiner

OPTICAL FIBERS FOR SIMULTANEOUS MEASUREMENT OF TEMPERATURE AND STRAIN

CROSS REFERENCE TO RELATED APPLICATIONS

This application is a Non-Provisional application which claims the benefit of U.S. Provisional Application No. 62/598,515, filed Dec. 14, 2017, which is incorporated by reference in its entirety herein.

BACKGROUND

Disclosed herein are optical fibers that can be used for the measurement of temperature and strain. More specifically disclosed herein are optical fibers that can be used for an independent measurement of temperature and strain.

Brillouin scattering in an optical fiber is used for distributed strain and temperature measurement as the frequency shift of back scattered Brillouin Stokes (in the fiber) is dependent on both temperature and strain that are applied to the optical fiber during operation. In order to measure temperature or strain independently, the overall frequency shift of the Brillouin scattering peak need to be de-coupled into a temperature-induced shift and a strain-induced shift.

In order to distinguish between the effects of temperature and strain-induced shifts, a few methods have been proposed and applied: 1) using a sensor system where two fibers are deployed with one of the fibers being isolated from the strain; 2) a sensor system that uses at least two fibers or a dual core fiber with different temperature and strain shift coefficients for each fiber or each core; 3) using a few-mode optical fiber; or 4) dispersion-shifted fiber with multiple Brillouin scattering peaks which have different temperature and strain shift coefficients.

All of these methods of distinguishing between temperature and strain-induced shifts suffer from drawbacks.

SUMMARY

Disclosed herein is an optical fiber comprising a plurality of dopant concentration profiles in a core of the optical fiber; where the plurality of dopant concentration profiles comprises a first dopant concentration profile and a second dopant concentration profile; where the first dopant concentration profile is obtained from a first dopant that increases the refractive index of the core above its base refractive index and the second dopant concentration profile is obtained from a second dopant that decreases the refractive index of the core below its base refractive index; where the first dopant concentration and the second dopant concentration are each varied in a stepwise manner and wherein a ratio of the first dopant concentration to the second dopant concentration is operative to result in an interaction of a fundamental optical mode at a given wavelength with a plurality of acoustic modes thereby increasing a ratio of Brillouin Scattering intensity ratio of secondary, tertiary or quarternary peak relative to a Brillouin Scattering intensity of a primary peak to be greater than 0.4 in a Brillouin Scattering spectrum.

Disclosed herein too is a method comprising coating an inner surface of a glass tube with a first dopant and a second dopant; collapsing the glass tube to form a solid preform; drawing the solid preform to form an optical fiber; where in the optical fiber, the first dopant concentration and the second dopant concentration are each varied in a stepwise manner and wherein a ratio of the first dopant concentration to the second dopant concentration is operative to result in an interaction of a fundamental optical mode at a given wavelength with a plurality of acoustic modes thereby increasing a ratio of Brillouin Scattering intensity ratio of secondary, tertiary or quarternary peak relative to a Brillouin Scattering intensity of a primary peak to be greater than 0.4 in a Brillouin Scattering spectrum.

DETAILED DESCRIPTION

Disclosed herein is a single single mode or few-mode optical fiber that can be simultaneously used as a temperature and strain sensor. The fibers have a step refractive index profile that permits a substantial difference in frequency between primary, secondary, tertiary, and so on, Brillouin scattering peaks. The step refractive index profile is obtained by having dopants whose concentration profile in the fiber abruptly changes in a step-like manner. In addition, the intensities of the primary, secondary and tertiary Brillouin scattering peaks are sufficiently high to allow for accurate measurement. The sufficiently large difference in frequency between the peaks and the high intensities of the secondary and tertiary peaks permits the single mode or few-mode optical fiber to be used simultaneously as a temperature and strain sensor in a variety of operations.

Figure 1:
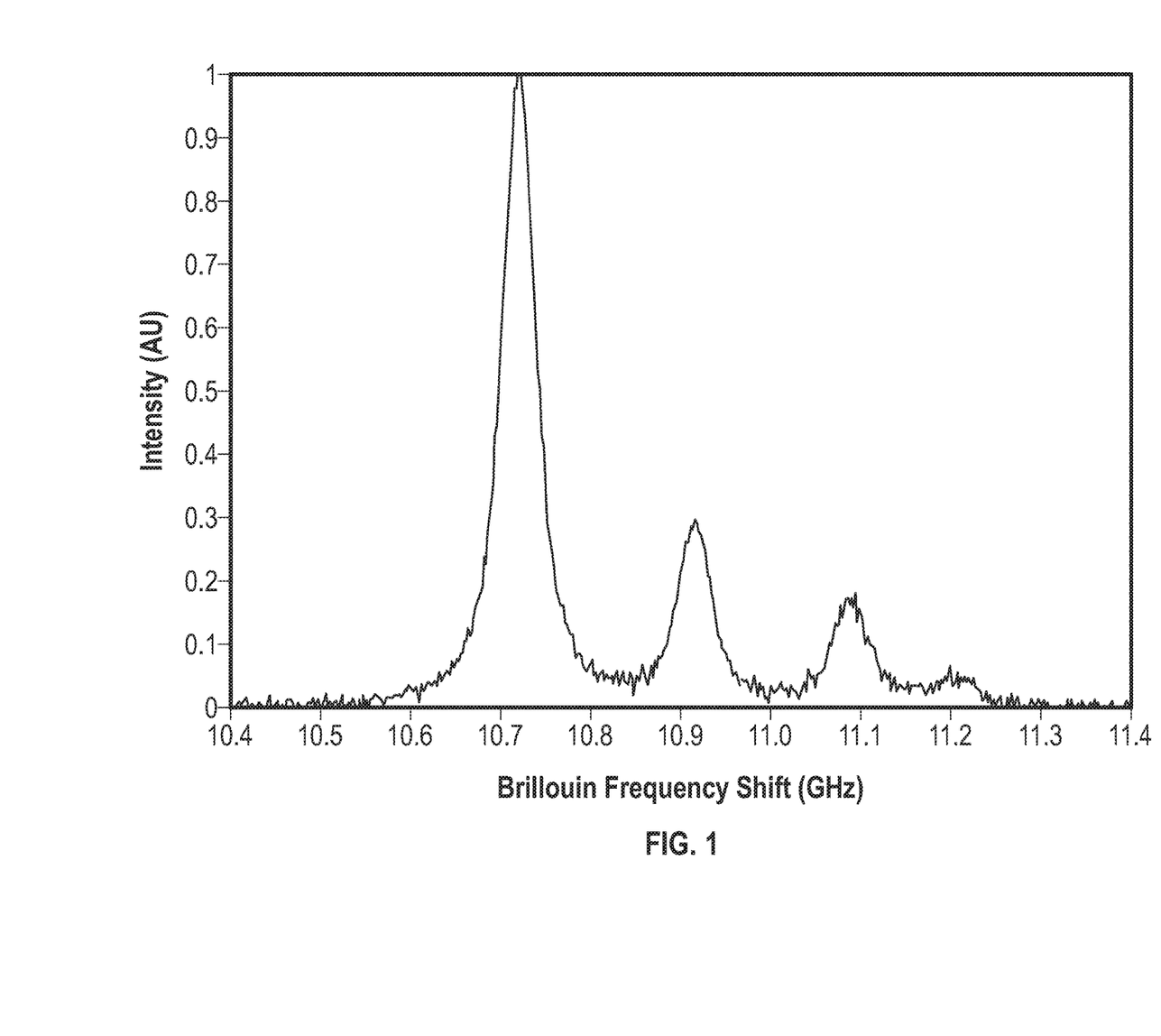
FIG. 1 is a graph of the Brillouin gain spectrum versus frequency shift for a fiber. While the frequency separation between peaks is large enough, the intensities of secondary and tertiary Brillouin scattering peaks are too weak for accurate measurement.

FIG. 1 is a graph of the Brillouin Gain spectrum versus Brillouin frequency shift for a presently commercially available optical fiber. FIG. 1 depicts the Brillouin scattering spectrum for the fiber. While the frequency separation between peaks is large enough, the intensities of secondary and tertiary Brillouin scattering peaks are too weak for accurate measurement. This renders the fiber inoperative as a temperature and strain sensor for simultaneously measuring the temperature and strain since the uncertainties of temperature and strain measurement are too big.

This deficiency is overcome by using a single mode or few-mode optical fiber with a step refractive index (referred to herein as a step index profile) profile that is derived from a step-like change in concentration of a plurality of dopants. The step index profile is achieved by using a composite fiber core that comprises sections with different glass compositions. In an embodiment, the step refractive index is accomplished by changing the composition of the core in a step function manner by using dopants. In another embodiment, in order to obtain a step refractive index profile, the dopant composition profile in the core will be a step function that promotes a step in the refractive index profile.

In a single mode fiber or in a few-mode fiber with a step index concentration profile, the Brillouin scattering peaks result from the interaction of the fundamental optical mode (at a given wavelength) with several acoustic modes. The wavelength may vary from 400 to 2100 nanometers, preferably 600 to 1800 nanometers, and more preferably 1300 to 1600 nanometers. A preferred wavelength (for deriving the Brillouin scattering peaks because of an interaction of the fundamental optical mode with several acoustic modes) is 1550 nanometers.

In a single mode fiber with a complex refractive index profile, the different glass compositions of the core may change the distribution of acoustic modes, enhancing the formation of multiple Brillouin scattering peaks at different frequencies. The relative peak intensities (of the Brillouin scattering peaks) are a function of the overlap between the fundamental optical mode and the acoustic modes.

For such a single mode fiber to be used for a reliable simultaneous measurement of temperature and strain, the separation between the two selected peaks (one for temperature and one for strain) needs to be sufficiently great such as the separation in frequency between the main peak and the peak next to it shown in FIG. 1. Furthermore, their peak intensities need to be comparable in magnitude to ensure reliable measurement of temperature and strain. As noted above, comparable peak intensities between the primary scattering peak and the scattering intensities of one of the other peaks (the secondary, the tertiary, the quarternary peak, and the like) can be achieved by increasing the overlap of fundamental optical mode with the higher acoustic modes.

Using a single fiber with a suitable dopant profile is advantageous in that it offers a simple and effective method for the use of a single single mode or the few-mode fiber to be used as a temperature and strain sensor. To achieve low measurement uncertainties, the separation of the two peaks in Brillouin frequency needs to be sufficiently large. In addition, the temperature or strain coefficients of the frequency shift for the peaks is significantly different and the peak intensities of any two peaks need to be comparable.

In an embodiment, the frequency difference between any two Brillouin peaks is greater than 0.2 gigahertz (GHz), preferably 0.3 to 2 GHz, and preferably 0.35 to 1 GHz. Frequency differences greater than 2 GHz are also acceptable for sensing.

Ratios of peak intensities between the intensity one of the other scattering peaks (the secondary, the tertiary, the quarternary peak, and the like) to that of the primary scattering peak should be greater than 0.4, preferably greater than 0.5, preferably greater than 0.75, preferably greater than 0.8, and more preferably greater than 0.9. In an embodiment, ratios of peak intensities between the intensity one of the other scattering peaks (the secondary, the tertiary, the quarternary peak, and the like) to that of the primary scattering peak is preferably 0.95 to 1.0.

In an embodiment, the single mode or few-mode core is doped with two or more dopants. Each dopant comprises a different doping element. In an embodiment, the core is doped with a plurality of dopants. One of the dopants (a first dopant that produces a first dopant concentration profile) increases the refractive index of the core above that of its base refractive index, while the other dopant (a second dopant that produces second dopant concentration profile) decreases the refractive index of the core below that of its base refractive index. Combinations of dopants that increase the refractive index with those that decrease the refractive index relative to the refractive index of the core may also be used to create the first dopant concentration profile and/or the second dopant concentration profile.

The concentration profile for the first dopant and the second dopant is controlled to increase the interaction between the interaction of a fundamental optical mode at a given wavelength with a plurality of acoustic modes thereby increasing a ratio of Brillouin Scattering intensity of a secondary, tertiary, quarternary peak to the Brillouin Scattering intensity of a primary peak in a Brillouin Scattering spectrum at a given wavelength.

In an embodiment, the core preferably comprises silica. In the case of silica fibers, typical index-raising dopants are germania ($GeO_2$, germanosilicate fibers), phosphorus pentoxide ($P_2O_5$, phosphosilicate), titania ($TiO_2$), alumina ($Al_2O_3$, aluminosilicate), or a combination thereof. Alternatively, or in addition, the index of the cladding may be lowered e.g., by using fluorine, boron oxide ($B_2O_3$) dopants, or a combination thereof. Index-lowering dopants can also be used in the core if other desired dopants make the refractive index difference too high.

Figure 2A:
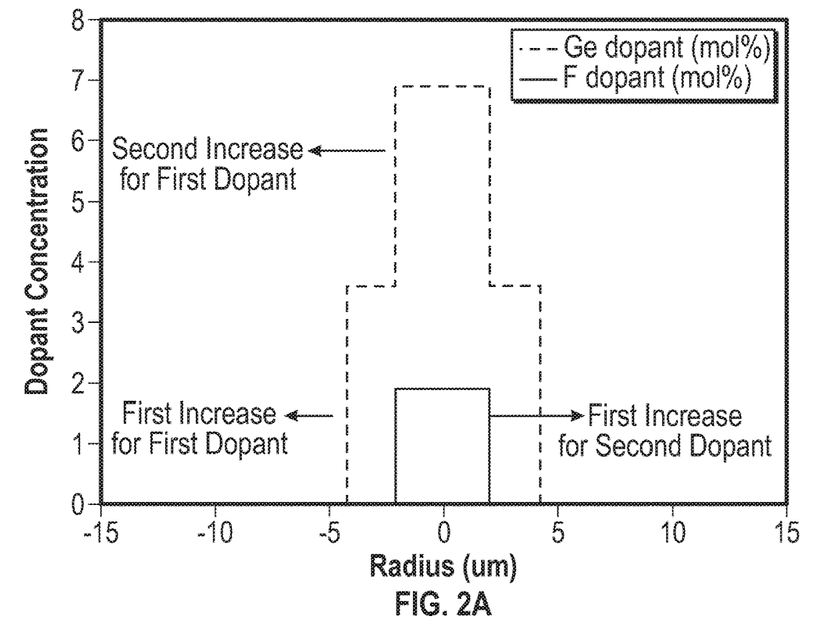
FIG. 2A reflects the dopant concentration profile of the disclosed optical fiber.
Figure 2B:
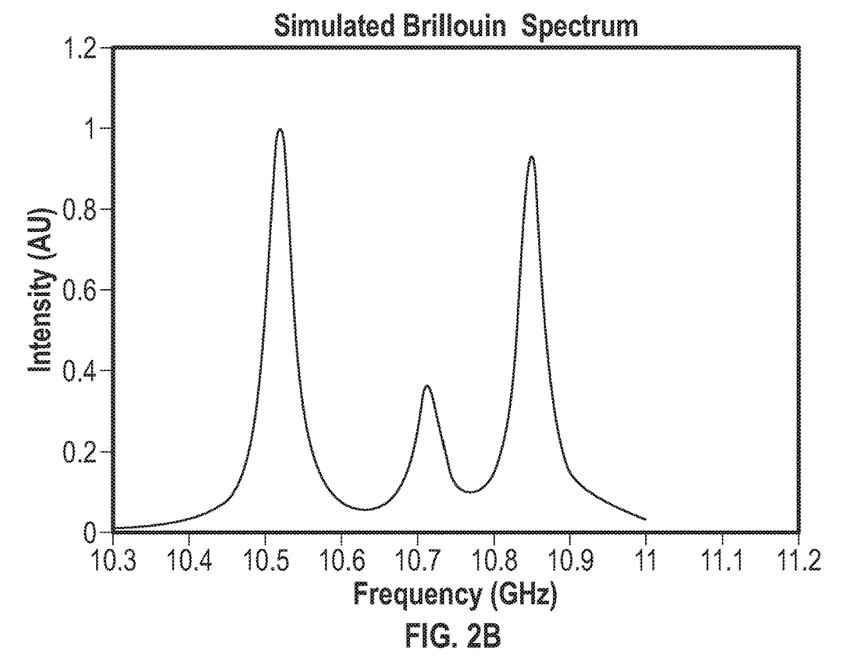
FIG. 2B is a graph that depicts a simulated Brillouin scattering spectrum for an optical fiber having the dopant concentration profile of the FIG. 2A.

The FIG. 2A reflects an exemplary dopant concentration profile of the disclosed optical fiber. Both germania and fluorine dopant concentration profiles are indicated (for germanium and fluorine respectively) in the FIG. 2A. In the FIG. 2A, the goal of the design in the FIG. 2A is to maintain its single mode operation optically at 1550 nm while allowing for a greater overlap of the fundamental optical mode with higher order acoustic modes. FIG. 2B depicts a simulated Brillouin scattering spectrum which indicates the existence of a third peak (also known as a tertiary peak) located sufficiently away from the main peak and of a comparable intensity.

Figure 3:
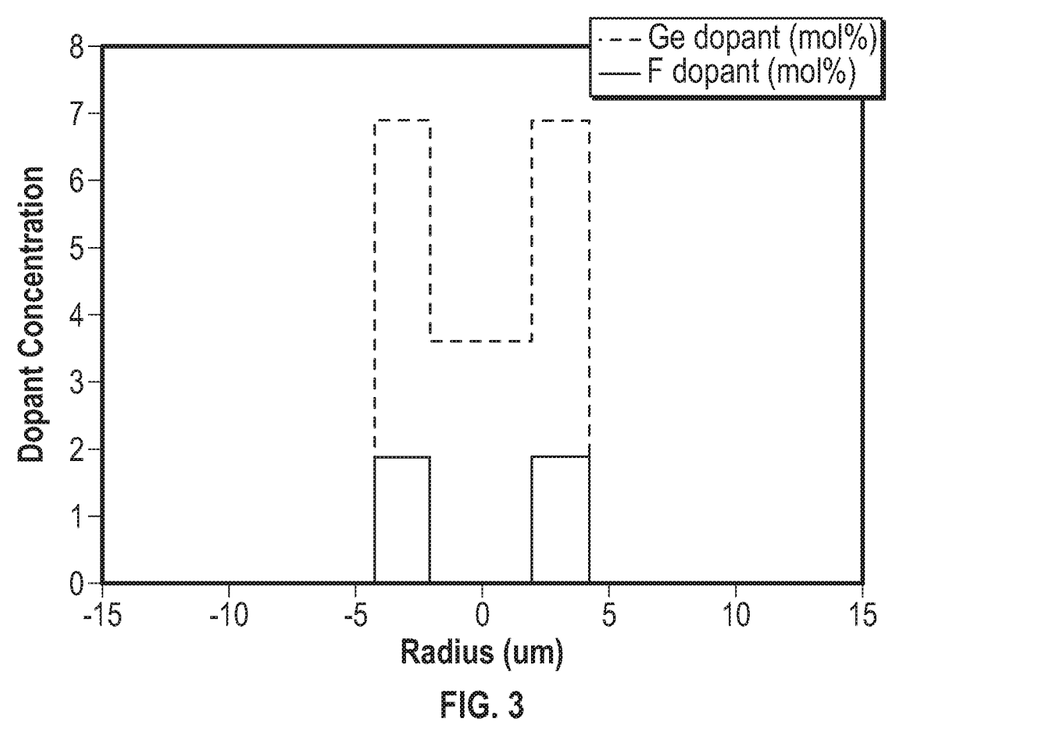
FIG. 3 is reflects another dopant concentration profile for the disclosed optical fiber.

The measured Brillouin spectrum of an experimental optical fiber with the designed dopant profiles as shown in FIG. 2A exhibiting a strong peak located a frequency greater than 10.8 GHz with an intensity about 97% of that of the main peak, is shown in FIG. 3. For comparison, the Brillouin spectrum of the commercially available LEAF® fiber, as shown in FIG. 1, exhibits higher order scattering peaks that have an intensity that is less than ⅓ of that of the main peak.

As can be seen in the exemplary depiction of the FIG. 2A, the dopant concentration includes a step function. The step function is an abrupt increase or decrease in the dopant concentration in the radial direction of the core. The dopants used to achieve the desired characteristics for the core may include a first dopant that increases the refractive index above that of the core refractive index and a second dopant that decreases the refractive index below that of the core refractive index. The dopant concentration of each of the dopants is symmetrical about a longitudinal axis of the core.

For the first dopant (e.g., the first dopant that increases the refractive index above that of the core refractive index), the concentration at the outer radius of the core is generally zero. At 25% to 75% of the radius (measured from the centerline of the core), the dopant concentration first increases (the first increase) abruptly to a desired value. The dopant concentration may then remain constant as the radius decreases. After remaining constant in the radial direction, the dopant concentration may once again increase abruptly (the second increase) at 20% to 60% of the radius (measured from the centerline of the core), or alternatively, it may decrease (the first decrease) abruptly till the centerline of the core. The centerline of the core is also referred to as the longitudinal axis.

The first increase in first dopant concentration may be 20 to 70%, preferably 30 to 60% of the total molar concentration of the first dopant in the core. The second increase in first dopant concentration may be 30 to 80%, preferably 40 to 70% of the total molar concentration of the first dopant in the core. The first decrease in first dopant concentration may be 25 to 65%, preferably 35 to 55% of the total molar concentration of the first dopant in the core.

For the second dopant, (e.g., the second dopant that decreases the refractive index below that of the core refractive index) the concentration of the dopant is zero from the outer circumference of the core to a point located 10 to 50% of the core radius (measured from the centerline). The concentration of the dopant may remain constant till the centerline of the core is reached. The first increase in second dopant concentration may be 5 to 50%, preferably 10 to 40% of the total molar concentration of the second dopant in the core.

While the FIG. 2A shows only two increases in the first dopant concentration and one increase for the second dopant concentration, it is possible to have multiple increases and decreases in concentration for the dopants. FIG. 3 shows another dopant profile for the plurality of dopants that may be used in the core to produce an optical fiber that can be used as a sensor for both temperature and strain. As may be seen in the FIG. 3, the first dopant and the second dopant have concentration profiles in the core that include two or more abrupt increases and two or more abrupt decreases. In an embodiment, the first dopant and the second dopant have concentration profiles in the core that include three or more abrupt increases and three or more abrupt decreases, preferably four or more abrupt increases and four or more abrupt decreases, preferably five or more abrupt increases and five or more abrupt decreases.

With regard to the FIG. 2A, an optical fiber manufactured with the actual dopant profile shown in the figure has a Brillouin scattering peak depicted in the graph in the FIG. 3. The simulated spectrum, FIG. 2 (b) indicated the existence of a third peak located sufficiently away from the main peak and with a comparable intensity. The measured Brillouin spectrum of an experimental optical fiber with the designed dopant profiles as shown in FIG. 2 (a) exhibiting a strong peak located a frequency greater than 10.9 GHz with an intensity about 97% of that of the main peak, is shown in FIG. 3. For comparison, the Brillouin spectrum of a LEAF fiber, as shown in FIG. 1, exhibits the intensities of the higher order scattering peaks that is less than ⅓ of that of the main peak.

The optical fibers described above may be fabricated using any of a variety of optical fiber manufacturing techniques, for example, Outside Vapor Deposition (OVD), Chemical Vapor Deposition (CVD), Modified Chemical Vapor Deposition (MCVD), Vapor Axial Deposition (VAD), Plasma enhanced CVD (PCVD), or the like, or a combination thereof.

In one embodiment, in one manner of manufacturing the disclosed optical fibers, a glass tube having an inside wall and an outside wall is heated to a temperature between 1100+C. and 1300° C. A plurality of reactive gases (that contain the respective dopants in the desired dopant molar ratio) is passed through the glass tube at a pressure between 1 and 30 hectopascals.

The reactive gases are introduced into the tube at a gas inlet end of the glass tube. A non-isothermal plasma is formed inside the tube to react the gas mixture to deposit glass layers directly on the inside wall of the glass tube without the formation of glass soot. A reciprocating plasma is formed between first and second reversal points inside the tube, the first reversal point being nearer to the gas inlet end of the tube than the second reversal point, to deposit a plurality of layers of glass on the inside wall of the tube doped with the desired dopants in the desired amounts. The inside-coated glass tube is then heat-collapsed to form a solid preform. The preform is then drawn to form the fiber with the desired dopant concentration profile.

The fibers disclosed herein may be exemplified by the following non-limiting examples.

EXAMPLES

Figure 4:
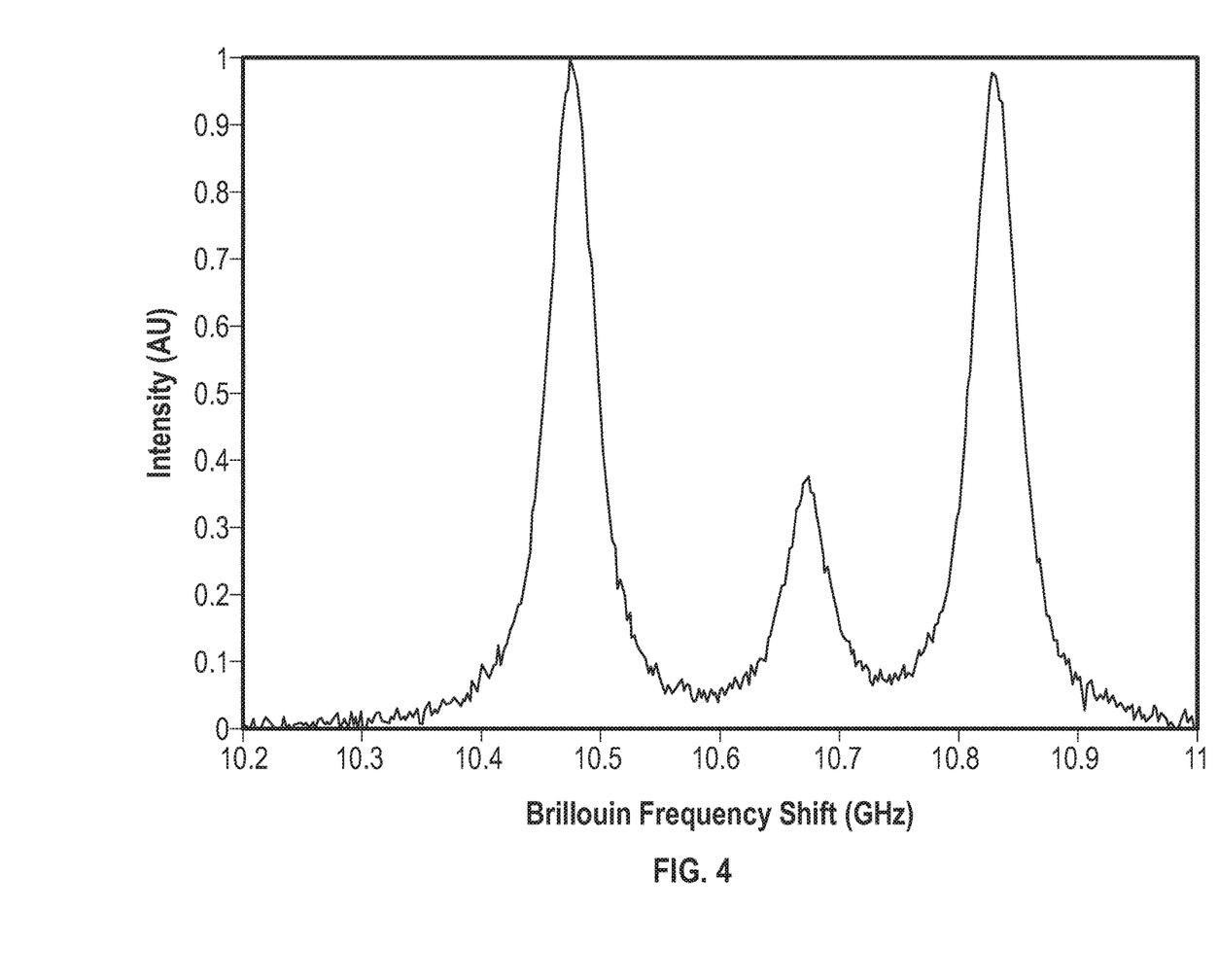
FIG. 4 and depicts a strong peak located a frequency greater than 10.8 GHz with an intensity about 98% of that of the primary peak at 10.48 GHz for a fiber having the dopant concentration profile of the FIG. 2A.

In this example, the dopant profile shown in the FIG. 2A (whose simulated Brillouin Scattering profile is depicted in the FIG. 2B) was actually subjected to illumination to measure the actual Brillouin Scattering. The actual profile is depicted in the FIG. 4 and depicts a strong peak located a frequency greater than 10.8 GHz with an intensity about 97% of that of the main peak.

In comparison, the Brillouin spectrum of a LEAF fiber, as shown in FIG. 1, exhibits an intensities of the higher order scattering peaks that is less than ⅓ of that of the main peak.

Figure 5:
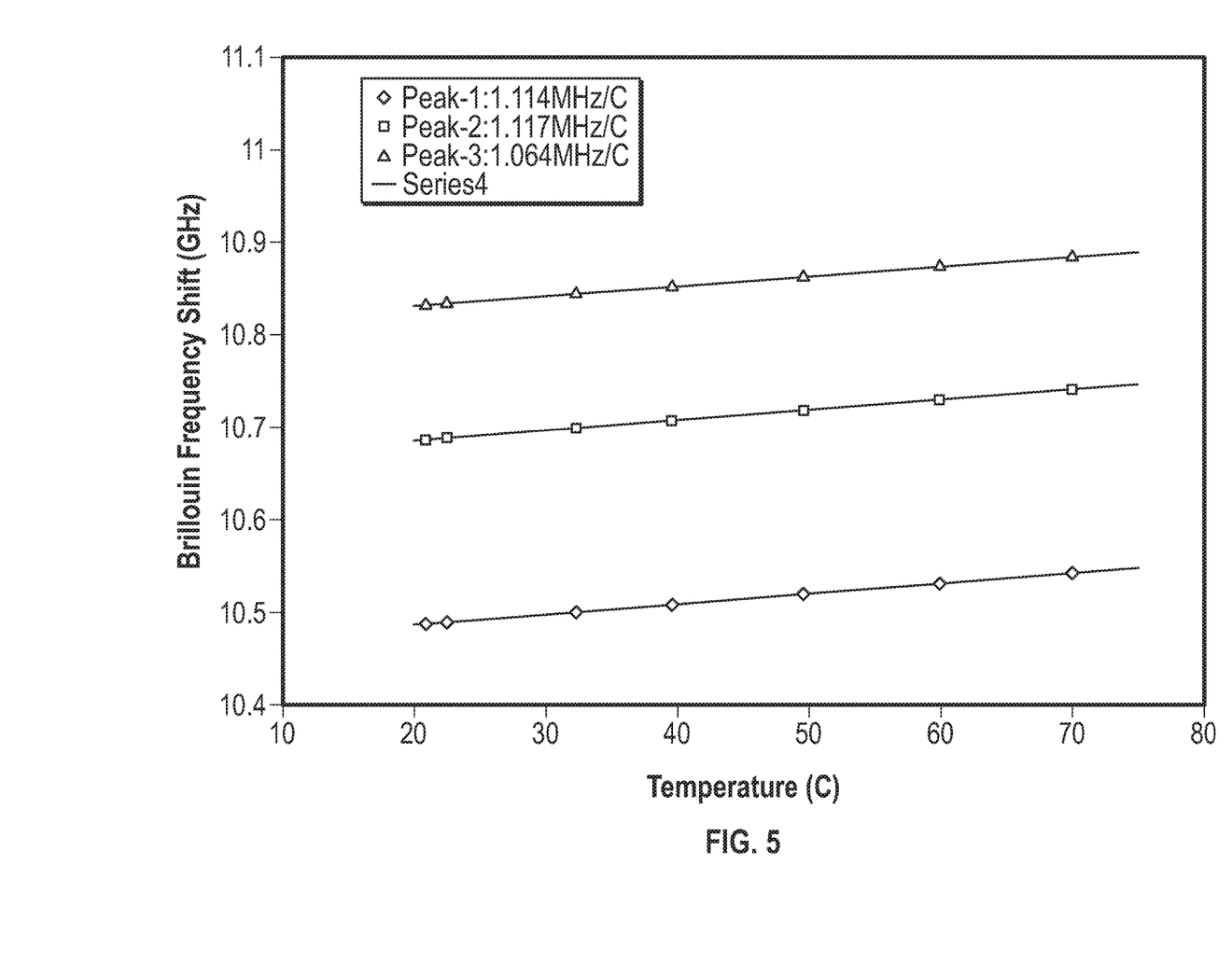
FIG. 5 is a graph that depicts a measured frequency shift of the three peaks for the experimental fiber as a function of temperature.

The measured frequency shift of the three peaks (from the FIG. 5) for the experimental fiber as a function of temperature is plotted in FIG. 5. As can be seen, the temperature coefficients of the frequency shift for the three peaks are significantly different for the simultaneous measurement of temperature and strain.

The disclosed fiber enables a single fiber to simultaneously measure temperature and strain and it obviates the need for separate fibers for measuring the temperature and strain. This facilitates using a simpler manufacturing and assembly process for the fiber. The disclosed fiber is also less expensive that other commercial fibers that are presently available on the market.

The invention claimed is:

1. An optical fiber comprising:
   a plurality of dopant concentration profiles in a core of the optical fiber; where the plurality of dopant concentration profiles comprises a first dopant concentration profile and a second dopant concentration profile; where the first dopant concentration profile is obtained from a first dopant that increases the refractive index of the core above its base refractive index and the second dopant concentration profile is obtained from a second dopant that decreases the refractive index of the core below its base refractive index;
   where the first dopant concentration and the second dopant concentration are each varied in a stepwise manner and wherein a ratio of the first dopant concentration to the second dopant concentration is operative to result in an interaction of a fundamental optical mode at a given wavelength with a plurality of acoustic modes thereby increasing a ratio of Brillouin Scattering intensity ratio of a tertiary or a quarternary peak relative to a Brillouin Scattering intensity of a primary peak to be greater than 0.4 in a Brillouin Scattering spectrum.

2. The optical fiber of claim 1, where the optical fiber is a single mode fiber or a few-mode optical fiber.

3. The optical fiber of claim 1, where the given wavelength is varied from 400 to 2100 nanometers.

4. The optical fiber of claim 1, where the first dopant is germania, phosphorus pentoxide, titania, alumina, or a combination thereof.

5. The optical fiber of claim 1, where the second dopant is fluorine, boron oxide, or a combination thereof.

6. The optical fiber of claim 1, where the ratio of Brillouin Scattering intensity ratio of secondary, tertiary or quarternary peak relative to a Brillouin Scattering intensity of a primary peak is greater than 0.5.

7. The optical fiber of claim 1, where the ratio of Brillouin Scattering intensity ratio of secondary, tertiary or quarternary peak relative to a Brillouin Scattering intensity of a primary peak is greater than 0.75.

8. The optical fiber of claim 1, where the first dopant concentration and the second dopant concentration are both symmetrical about a central longitudinal axis of the core.

9. The optical fiber of claim 1, where varying the first dopant concentration and the second dopant concentration in a stepwise manner includes three or more abrupt increases and three or more abrupt decreases in each of the first dopant concentration and the second dopant concentration.

10. The optical fiber of claim 1, where varying the first dopant concentration and the second dopant concentration in a stepwise manner includes four or more abrupt increases and four or more abrupt decreases in each of the first dopant concentration and the second dopant concentration.

11. The optical fiber of claim 1, where a single optical fiber is used as a sensor to simultaneously measure temperature and strain.

12. A method comprising:
coating an inner surface of a glass tube with a first dopant and a second dopant;
collapsing the glass tube to form a solid preform;
drawing the solid preform to form an optical fiber; where in the optical fiber, a first dopant concentration and a second dopant concentration are each varied in a stepwise manner and wherein a ratio of the first dopant concentration to the second dopant concentration is operative to result in an interaction of a fundamental optical mode at a given wavelength with a plurality of acoustic modes thereby increasing a ratio of Brillouin Scattering intensity ratio of a tertiary or a quarternary peak relative to a Brillouin Scattering intensity of a primary peak to be greater than 0.4 in a Brillouin Scattering spectrum.

* * * * *